Sept. 29, 1970     J. E. WATKINS     3,530,683
REFRIGERATION SYSTEM FOR CHILLING AND STORING MEAT PRODUCTS
Filed April 16, 1969     4 Sheets-Sheet 1

INVENTOR.
JOHN E. WATKINS,
BY
Wolfe, Hubbard, Voit & Osann
ATTORNEYS.

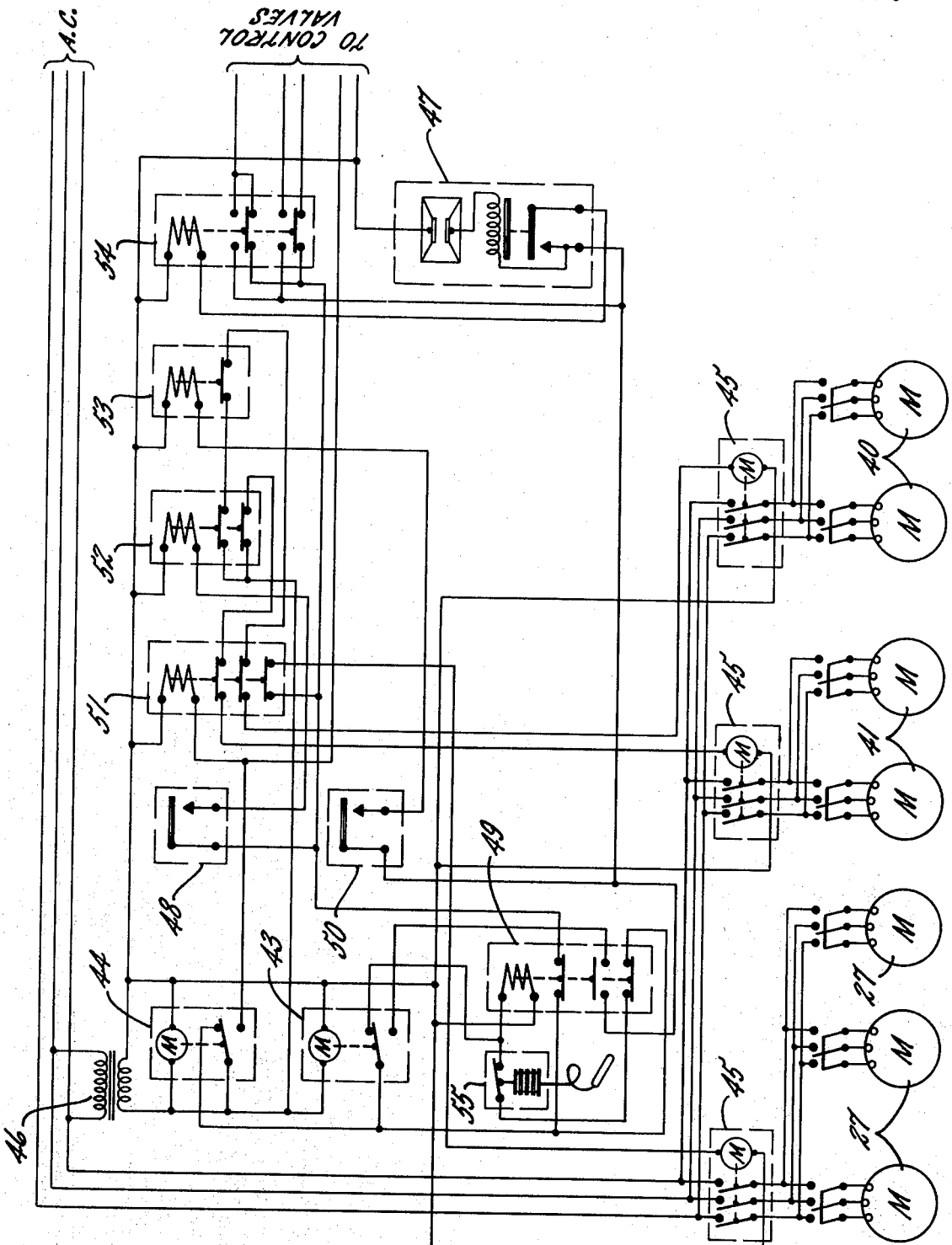

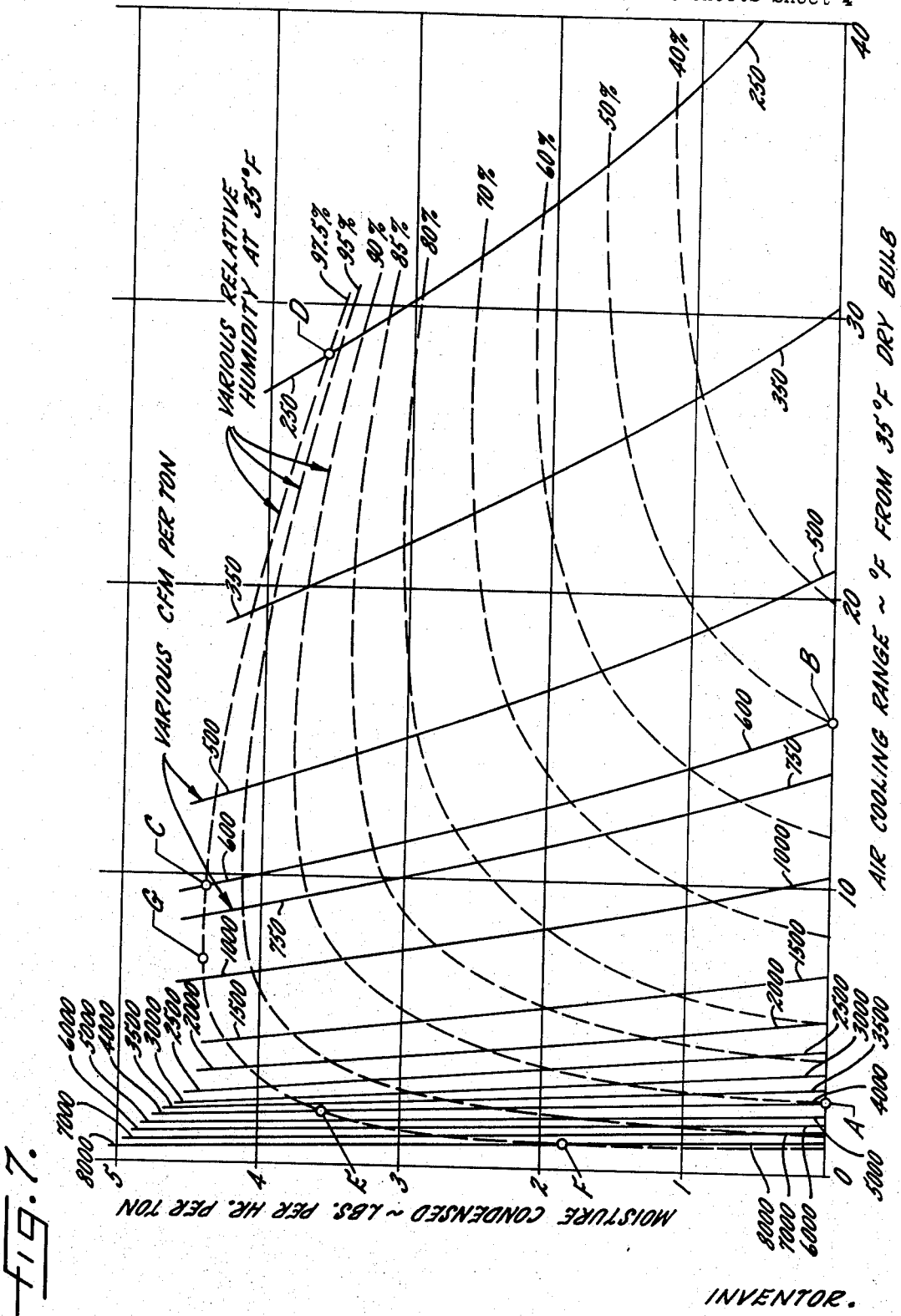

United States Patent Office 3,530,683
Patented Sept. 29, 1970

3,530,683
REFRIGERATION SYSTEM FOR CHILLING AND STORING MEAT PRODUCTS
John E. Watkins, 9 N. 3rd Ave., Maywood, Ill. 60153
Filed Apr. 16, 1969, Ser. No. 816,755
Int. Cl. F25d *17/04*
U.S. Cl. 62—89
16 Claims

ABSTRACT OF THE DISCLOSURE

Refrigeration apparatus and a method of operation are described in which a chill area is divided into individually controlled refrigeration zones. Separate temperature and humidity sensing elements are provided to control the evaporator and fan units in each zone, with the cooled air being directed downward and under the product to augment natural convection. When initially warm, moist product is introduced, air circulation is increased to an initially relatively high rate which results in a smaller overall air temperature cooling range allowing the relative humidity to increase and reducing moisture pickup from the product. Temperature control within the zone is accomplished by controlling the flow of liquid refrigerant into the evaporator, and control of excess humidity may thereafter be accomplished by selectively reducing the air circulation rate so that the air is cooled below its dew point within the evaporator, thereby to deposit a portion of its moisture.

---

This invention relates to refrigeration systems, and in its principal aspect concerns a refrigeration system and method of operation for preventing excessive moisture loss from an initially warm, moist product, such as fresh meat as it is brought from the packinghouse killing floor to the chill room.

The principal object of the present invention is to provide a refrigeration system for chilling compartments which will reduce or eliminate all unnecessary moisture pickup from an initially warm, moist product such as fresh meat, thereby substantially reducing shrinkage losses in chilling and storing such products.

Another object is to provide a coordinated system of temperature and humidity control for reducing or eliminating unnecessary shrinkage losses in the handling of fresh meat products.

Other objects and advantages of the invention will become apparent from the following detailed description and from the drawings, in which:

FIG. 6 is a schematic diagram of a third embodiment of the control system; and

FIG. 7 is a chart showing the amount of moisture condensed while cooling various air volumes from 35° F. and various relative humidities over a variable cooling range, illustrating the operation of the present invention.

Figure 1:
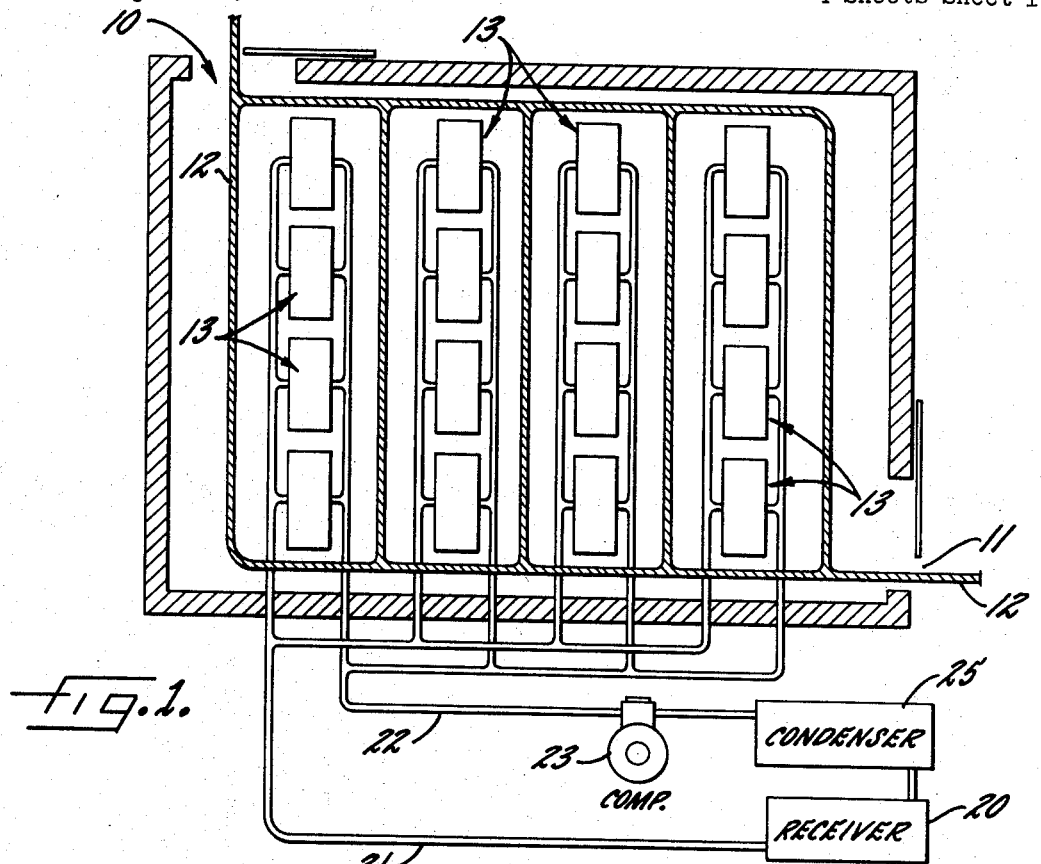
FIG. 1 is a diagrammatic plan view of a zoned chilling compartment with which the present invention is adapted for use.

While the invention is shown and described with reference to a particular application and in an exemplary embodiment, it is not so limited, but may be utilized in any cooling application in which an initially warm product which is subject to moisture loss by evaporation is to be chilled, and also when the product is to be thereafter maintained at carefully controlled storage conditions.

BACKGROUND AND ENVIRONMENT

In my United States Pat. No. 3,251,196 for Temperature and Humidity Control Means for Refrigeration System, issued May 17, 1966, means are described for controlling the humidity within a cooled constant-temperature storage compartment through a variable air circulation rate. When a rise in humidity above the desired humidity range is sensed by a humidistat, the air circulation rate is decreased so that the air passing over the cooling coils of the evaporator is cooled below its dew point for the particular temperature and humidity conditions then present. Moisture is thereby condensed on the evaporator and removed from the air returning to the storage compartment. When the temperature within the storage compartment varies from a given range of storage temperatures, a sensitive thermostat is effective to control the flow of liquid refrigerant into the evaporator, thus maintaining the desired temperature of the storage compartment. In situations where an initially very warm product is introduced into the storage compartment to be chilled, a bypass thermostat can be provided to be responsive to the resulting abnormal rise in temperature and to defeat the operation of the humidistat and thereby the air circulation reduction means, until the storage compartment temperature returns to within the given storage range and normal operation is resumed.

A difficulty with conventional refrigeration systems for use in the chill room of a meat packing operation, including the foregoing system of my Pat. No. 3,251,196, is that an initially warm, moist product such as fresh killed meat loses an unacceptably large amount of moisture to its surroundings during the initial stages of chilling prior to storage. To take a typical example, when a hot beef carcass at the animal's normal body temperature of 105° F. is taken from the killing floor of the packinghouse to the chill cooler where the temperature may be 35° F., this difference in temperature alone accounts for about 1 pound per square inch difference in vapor pressure between the carcass and its surroundings, thereby making the warm meat a virtual engine of moisture rejection until it reaches the storage temperature at which it is to be maintained until shipment. As is evident from any psychrometric chart, water at a high temperature has a higher vapor pressure than water at a low temperature, and it makes no difference whether this water is in the form of moisture in a warm meat product or simply a pan of water on a stove. The effect is the same.

The problem is compounded when a chilling room operation is to be run throughout the usual operating day of the packing plant. From a start in the morning with an empty chill room, fresh meat carcasses are brought in throughout the working shift and accumulated in the chill room. When the carcasses have been chilled to the desired storage temperature, they are held for storage either in the same room or another room, until removed for shipment or processing, at which time they are moved into a refrigerated truck or other transport means or into a process room. Care should always be taken to assure that the meat product is at about the same temperature as the refrigerated transport means or process room so as to avoid adverse effects of adjustment to the new temperature when the transfer is made.

The present practice in many chilling rooms is to initially cool the room to as low as 26° F. (as opposed to the usually desirable storage temperature range of about 29–31° F.) for a "quick chill" of the warm incoming meat product. In effect, this additional lowering of air temperature causes an even greater difference in vapor pressures between the incoming product and the cold air, causing an even greater and quicker weight shrink due to moisture loss in addition to the supposedly desirable quick chill. With the cost of beef carcasses running about 50 cents per pound at present, it can easily be seen that each pound of moisture which is prevented from leaving the meat product will be reflected in additional profits for the meat packer, since the carcasses are sold on a dressed weight basis after chilling. The same of course applies also to hogs and other meat animals.

With very low evaporation temperatures during chilling it is also difficult or impossible with present systems to control the amount of moisture being taken out of the air and condensed on the surface of the evaporator. This sends relatively drier air back to the room where it can absorb that much more moisture from the product.

LAYOUT AND EQUIPMENT

Referring to FIG. 1 there is shown a chill room in a meat packing plant with which the present invention is adapted for use. At one side of the room is an entrance 10 from the killing room of the meat packing plant through which the freshly killed meat carcasses are received. At another side of the room is a loading door 11 through which the chilled carcasses are transferred to storage or process coolers or refrigerated trucks or railroad cars for shipment. While other entrances, exits, and similar facilities may also be present, they are omitted from the drawing for purposes of clarity.

Figure 2:
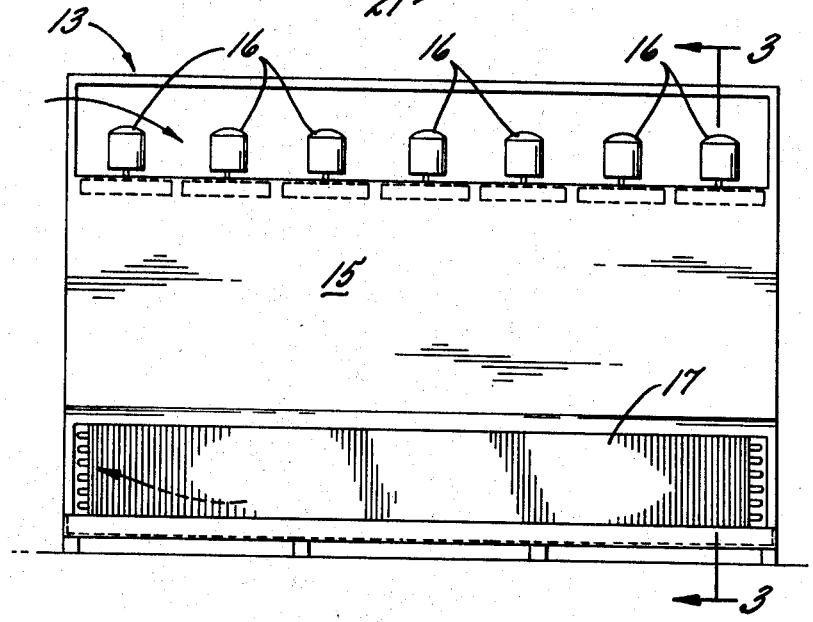
FIG. 2 is a side elevation of a zone cooling unit incorporating an evaporator and a plurality of fans.
Figure 3:
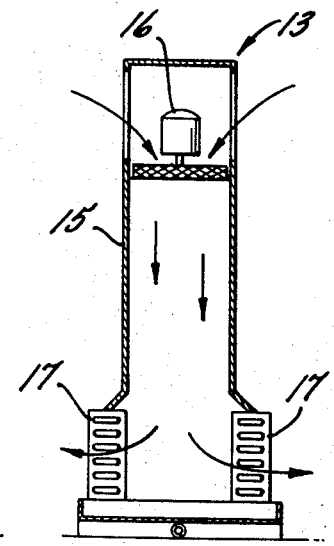
FIG. 3 is an end elevation of the zone cooling unit of FIG. 2 taken in the plane 3—3.

Carcasses from the killing room enter through the loading door 10 on a rail conveyor 12. This conveyor allows the carcasses to be moved into the chill room and arranged in aisles, which in the illustrative embodiment are five in number. Between each pair of aisles is a row of individual cooling units 13 which are shown in detail in FIGS. 2 and 3. Each cooling unit 13 consists of a housing 15 having openings at top and bottom to allow a flow of air to be propelled downwardly therethrough by a plurality of individual fans 16. At the bottom opening of the housing 15 is a dual evaporator unit 17 which cools the incoming flow of air drawn through the unit by fans 16. At the bottom, the air passes out through side openings in the housing 15 and back into the lower portion of the chill room. If desired, a hot gas or electrical defrosting means may be provided in the base of the cooling unit housing 15.

Downdraft circulation is used rather than discharging air horizontally over the warm product as is conventionally done. The chilled air flowing over the product becomes warmer and absorbs moisture, thereby becoming lighter and tending to rise. An area of relatively low pressure is thereby created at the lower portion of the room and the downdraft forced convection assists the natural flow of air and results in a smoother and more uniform flow of air without high temperature pockets or stagnant areas where chilling may be retarded. Since other sources of heat loss also exist within the chill room such as poorly insulated walls, exposed electric lights, and even personnel working in the room, the same principles apply and convection is further enhanced.

In the illustrative embodiment, the chill room includes a total of sixteen separate cooling units in four rows of four units each, each being supplied from a common source of liquid refrigerant and discharging refrigerant vapor to a common return line. Liquid refrigerant from a receiver 20 or other source of supply flows through a supply line 21 to the chill room, with individual branch pipes carrying liquid refrigerant to each cooling unit.

After evaporating in the evaporator 17 of each unit 13, the refrigerant vapor is discharged into a return line 22 and directed to a compressor 23 wherein the refrigerant is compressed to a higher temperature and pressure and carried to a condenser 25. The condenser is cooled by air or water in the usual manner, and in it the refrigerant is again liquified and returned to the receiver 20 for circulation back through the system.

As provided for by the invention, the use of individually controlled refrigeration zones allows the system to be run either by treating each zone as a separate chill room, or by slowly moving the carcasses through in a continuous assembly-line fashion. The separate controls for each zone condition the temperature and humidity characteristics of the circulated air in a manner which results in minimum moisture shrinkage losses in all phases of the chilling operation.

Figure 4:
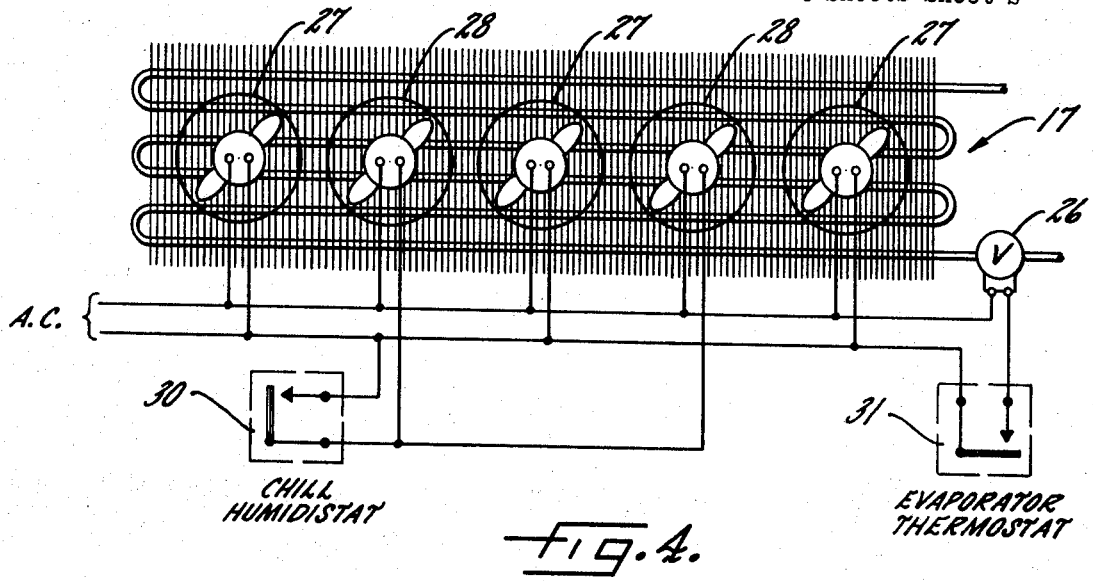
FIG. 4 is a schematic diagram of a first embodiment of the control system of the apparatus employed with the present invention.
Figure 5:
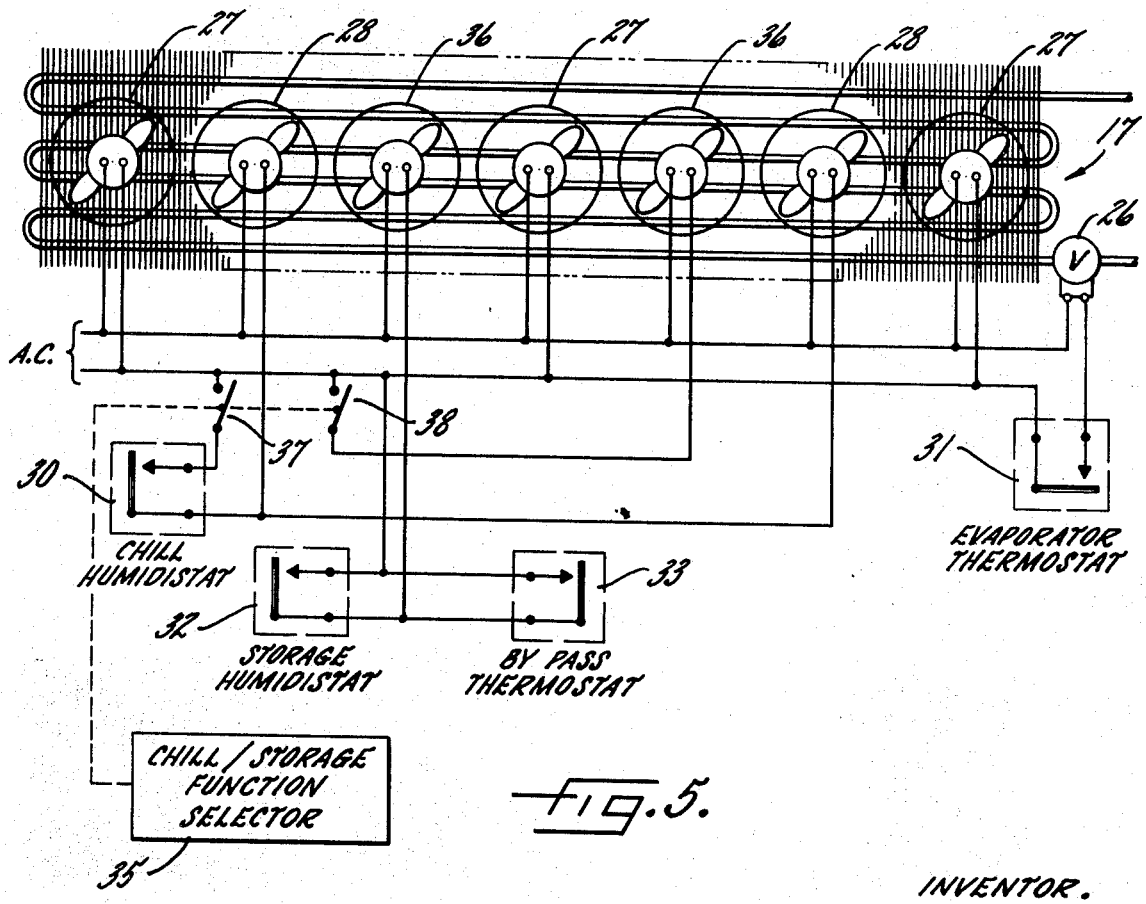
FIG. 5 is a schematic diagram of a second embodiment of the control system.

In each unit 13, as illustrated in the alternative embodiments of FIGS. 4 and 5, liquid refrigerant from the supply line 21 enters through an electrically controlled solenoid supply valve 26. While a simple off-on type valve is shown, it will be understood that the supply valve 26 may also be a modulating valve or one having a plurality of progressive open positions. Another valve (not shown) may also be added in the outlet of the evaporator 17 to control the suction side of the unit, preferably a valve of the modulating type. As a greater cooling capacity is required in the cooling unit, more liquid refrigerant is evaporated in the evaporator 17 and thereby absorbs more heat from the air drawn from the upper portion of the chill room through the housing 15 by the fans 16.

THE TEMPERATURE AND HUMIDITY RELATIONSHIP

In the storage of fresh meat it is desirable to maintain conditions of temperature and humidity which avoid freezing of the meat product, which avoid shrinkage through excessive evaporation of moisture and which also avoid sliming and souring from prolonged storage in conditions of excessive humidity. In the case of fresh beef, the meat must always be warmer than 27° F. to avoid freezing and the long-term conditions of storage must maintain a relative humidity of not greater than 97.5% to avoid sliming and souring. The refrigeration load on the cooling equipment also varies widely. The load on the system is greatest at times when fresh carcasses are entering the compartment, and it is during these periods when the moisture being lost from the product and added to the atmosphere is also at a maximum. As the working day continues the chill room will tend to fill up, and the maximum heat load is reached when the last carcass is placed in the room.

Depending on whether or not means are provided for defrosting the individual cooling units 13, the minimum temperature in the cooling unit may have to be restricted to a low of 25° to 26° F. to avoid the formation of frost on the cooling surfaces of the evaporator 17. By eliminating frost formation the necessity for defrosting the evaporator 17 is eliminated, but with suitable defrosting means a lower temperature dictated by the freezing point of the meat may be utilized instead.

The relationship between temperature, humidity and heat energy in air is commonly represented by the familiar psychrometric chart, well known to refrigeration engineers. In a common form of this chart the variable of the dry bulb temperature of the air is disposed along the abscissa, and the humidity ratio in pounds of water per pound of dry air is disposed along the ordinate. Various other lines show various constant values of relative humidity (percentage degree of saturation), wet bulb temperature, specific volume, and enthalpy in B.t.u. per pound of dry air.

For purposes of understanding the present invention, it is useful to display the psychrometric information found in the usual chart in a different manner, as illustrated in FIG. 7. This improved chart has as its abscissa the variable of cooling range of air cooled from 35° F., and as its ordinate the amount of moisture condensed in pounds per hour per ton of refrigeration effect. (A ton of refrigeration effect is defined as 12,000 B.t.u. per hour.) Also shown on the chart of FIG. 7 are lines representative of incoming air at various relative humidities at 35° F. dry bulb, and air flow volumes expressed as various c.f.m. (cubic feet per minute) per ton of refrigeration effect.

A simple illustrative example will serve to show how the chart of FIG. 7 was derived. Taking air at 35° F. dry bulb and 90% relative humidity, for this air to reach its dew point (where it becomes saturated and the removal of any additional heat will result in the condensation of moisture) it must be cooled to about 32.5° F. and in doing so will give up 0.6 B.t.u. per pound of dry air. If cooled another 2.5° F. to 30° F. dry bulb, it will give up another 107 B.t.u. per pound plus dropping out 0.00039 pound of moisture as condensation. Under these conditions, the given pound of dry air represents about 12.55 cubic feet at the 35° F. and 90% relative humidity condition. In order to precipitate one pound of moisture through this exemplary cooling range a total of 2,560 pounds of air must therefore be cooled. Since one ton of refrigeration is 12,000 B.t.u. per hour, the deposit of one pound of moisture per hour requires 0.356 ton of refrigeration effect. Expressed in terms of air flow rate, this represents 1,500 cubic feet per minute of air flow per ton of maximum refrigeration effect.

To summarize this exemplary point, 1,500 cubic feet per minute of air cooled from 35° F. and 90% relative humidity to 30° F. will require one ton of refrigeration effect while precipitating 2.8 pounds of moisture per hour. By taking other typical operating conditions starting in each case with air at 35° F., the other points making up the chart of FIG. 7 were similarly calculated.

The chart of FIG. 7 is particularly useful in illustrating certain desirable conditions in a chill or storage compartment wherein little or no moisture is precipitated. Taking as an example the 90% relative humidity line, there is one practical air circulation condition at 35° F. and 90% relative humidity which will deposit no moisture, this being about 4,000 c.f.m. per ton cooled from 35° F. to 32.5° F. (point A). Generally, to achieve constant moisture removal from the system more humid air need be cooled through a smaller cooling range than in the case of less humid air, and if less moisture is to be removed with the same refrigeration effect, a smaller cooling range must be used with a consequently greater air flow.

Practical considerations of equipment cost dictate a normal cooling range of perhaps 15° F. as a maximum, which for zero moisture dictates a minimum air flow rate of approximately 700 c.f.m. per ton, but only for air starting at the relatively low relative humidity of 50% (point B). For higher starting humidities, some moisture will be necessarily dropped out as the air is cooled by passing through the evaporator.

In prior installations the practice has been followed of using a relatively large temperature cooling range for air circulated during the initial stages of chill in the attempt to achieve the fastest temperature drop in the product. But as can be seen from the chart of FIG. 7, this means a necessarily high rate of moisture removal for all relative humidities greater than 50%, reaching a peak as illustrated of about 4.4 pounds per hour per ton of refrigeration effect at a starting relative humidity of 97.5% which is not unusual in practice (point C). If the moisture is being lost from fresh beef, this rate amounts to a loss of $2.20 in product weight per hour for each ton of refrigeration used, and for a commonly used eight-ton evaporator unit 13, this represents an economic loss to the operator of $17.60 for each hour of such operating conditions.

If the amount of moisture removed is to be lowered, say to 3.6 pounds per hour per ton, two alternatives are presented. First, the air cooling range can be increased to about 28° with a reduced air flow of 250 c.f.m. per ton (point D), but this would require an uneconomic expenditure in additional refrigeration equipment to achieve such a large temperature drop, plus the likelihood of freezing the meat unless careful control of the process were maintained. On the other hand, about the same saving in moisture loss can be achieved with a much reduced temperature range of only 2° F. by using an increased air flow of approximately 4,000 c.f.m. per ton (point E). To reduce the moisture removal even further, even from the relatively high starting point of 97.5% relative humidity at the exemplary 35° dry bulb temperature, moisture removal can be reduced to only about 1.8 pounds per hour per ton by using an air flow of 8,000 c.f.m. per ton (point F). The refrigeration equipment required to achieve this relatively small cooling range is no different from that commonly used in existing refrigeration installations. The increased air flow rate required for operation at this point is accomplished by the addition of more fans or increased fan speed, and as will be shown hereinafter the cost in fan horsepower and increased electric power requirements is more than made up in the reduced shrink of the meat product. As an additional advantage, there is no danger of freezing the product and close attention to the process in this regard is not required. In general, the advantages of practicing the invention are enjoyed only by operating in the far-left hand area of the chart of FIG. 7 where the lines of constant relative humidity turn sharply downward after passing a peak or knee in the curve as shown by the 97.5% relative humidity line at approximately 7° air cooling range and 4.4 pounds per hour per ton of refrigeration effect (point G). It has been found in the design of refrigeration equipment for meat chilling applications that the advantages of following the operating conditions suggested by the chart of FIG. 7 are obtained only by providing air flow capacities of 2,000 c.f.m. per ton and above. As a practical matter, 3,000 c.f.m. per ton is a generally preferred minimum satisfactory working capacity, measured at the point of maximum refrigeration load, reaching as much as 8,000 c.f.m. per ton or more as the load falls off. A preferable working value is about 5,000 c.f.m. per ton.

To demonstrate the savings made possible by practicing the present invention, a comparison can be made of the cost of increased air circulation capacity with the savings in reduced meat shrinkage. A reasonable estimate of the cost of additional fan horsepower is about $8.00 per operating month per horsepower, while the cost of shrinkage in beef carcasses can be assumed to be about 50 cents per pound. Thus, if one additional horsepower of fan capacity will result in saving only 16 pounds (two gallons) of moisture per month it will have paid for itself, and any increased saving in moisture loss will result in increased profits for the operator. For the exemplary eight-ton unit discussed previously, with a starting relative humidity of 97.5%, an increase in air flow from 700 c.f.m. (point C) to 4,000 c.f.m. per ton (point E) will save 4.4 less 3.6 or 0.8 pound of moisture per hour per ton, or a total of 6.4 pounds per hour for the unit. The added fan cost for this unit for this hypothetical example will thus pay for itself for meat chilling operations in less than three hours of operation. In practice, the savings achieved will vary according to actual operating conditions which vary from the idealized hypothetical condition of constant 35° F. entering air and 97.5% relative humidity but will be generally comparable. In fact, a study of the temperature and humidity data presented in the form of FIG. 7 will show that a given increase in air circulation rate will generally result in increasing savings in moisture removal as the relative humidity decreases.

Of course a realistic upper limit for the air circulation rate must be determined from considerations of equipment cost and shrinkage savings to be expected, and this may be as high as 8,000 c.f.m. per ton or greater predicated by the chart of FIG. 7 at the point where the 97.5% relative humidity line meets the zero point of the ordinate, indicating that no moisture is removed at all. On the other hand, in some cases such large air flow capacity may not be economical but for most applications a capacity of at least 3,000 c.f.m. per ton is the preferable rate, at the point of maximum refrigeration effect.

CONTROL SYSTEMS

A refrigeration system designed to function according to the foregoing principles is characterized by its response to increased temperature and humidity in that both the refrigeration effect and the air circulation rate are desirably increased. This is the situation when a fresh load of warm, moist carcasses are brought in from the killing floor to an empty chill room, or to one which is partially filled but which has reached stabilized conditions of temperature and humidity. Three exemplary control systems are shown in FIGS. 4, 5 and 6.

In the system of FIG. 4, there are five individual fans of which three fans 27 run constantly while two added fans 28 are energized upon the sensing of increased relative humidity by a chill humidistat 30. A thermostat 31 opens and closes the liquid refrigerant supply valve 26 to regulate refrigerant flow to the evaporator 17. Such a simplified installation would be usable, for instance, in a chill room used exclusively for chilling a fresh killed meat product. After the product is brought to the desired temperature conditions for storage, it would be moved off to another storage area. The chill humidistat 30 would preferably be set to energize the added fans 28 when the incoming air reached a predetermined relative humidity value, preferably in a range of about 75%.

If the three constantly running fans 27 are each capable of supplying air at a rate of 1,000 c.f.m. per ton for a total of 3,000 c.f.m. per ton, then the addition of two more equal-sized fans 28 will bring the rate up to 5,000 c.f.m. per ton, allowing the relative humidity within the chill compartment to rise to over 75% before any moisture at all begins to be lost. Utilization of the maximum air flow rate is coupled with the maximum refrigerating effect available from the evaporator 17, since the evaporator thermostat 31 wil have fully opened the supply valve and any other control valves to maintain the evaporator in a fully flooded condition as the air entering the evaporator warms up to its highest temperature.

A combination system is shown in FIG. 5 for operating the same compartment in both chill and storage functions. During the chill phase the system operates in the same manner as the system of FIG. 4, while for the storage phase the system operates in the manner described in my Pat. No. 3,251,196, mentioned previously. There is a chill humidistat 30 and an evaporator thermostat 31 as before, but with additional control elements in the form of a storage humidistat 32 and a bypass thermostat 33. A selection of functions between the latter elements 32, 33 and the chill humidistat 31 is achieved through a chill/storage function selector means 35 which may be any suitable device such as a time clock or even a manually controlled switch.

In the embodiment of FIG. 5 there are seven fans of which three fans 27 are constantly running during chill. Another pair of fans 36 runs constantly during storage conditions when the relative humidity is within the correct predetermined range. During storage operation the chill/storage function selector 35 causes switches 37, 38 to be opened, leaving the control of the fans 36 to the storage humidistat 32. Should the relative humidity during storage increase above a predetermined maximum level, preferably about 96%, the rise is detected by the storage humidistat 32 which cuts out the fans 36. This brings the air circulation rate down to a point where it falls within the moisture removal area of the chart of FIG. 7 and excess moisture is removed until the humidity drops back to within the desired range. Should the temperature of the compartment during storage rise abnormally due to a factor other than the addition of more warm, moist product, such as by the door opening for an excessive period of time, the bypass thermostat 33 causes the fans 36 to operate in spite of the condition of the storage humidistat 32 and causes the supply valve 26 and any other control valve to open fully, thereby promoting maximum cooling through maximum air flow and heat transfer.

For chill operation with the system of FIG. 5, the chill/storage function selector 35 is switched to its alternate position, closing the switches 37, 38. In this condition the fans 36 are caused to operate constantly in the same manner as the fans 27, while the fans 28 furnish extra air circulation capacity as may be required to minimize moisture removal and product shrinkage. This capacity is utilized in the same manner as the preceding embodiment of FIG. 4, with the chill humidistat 31 causing the fans 28 to come into operation upon sensing an increase in relative humidity above a predetermined level, preferably about 75%.

A somewhat more complex embodiment is illustrated in FIG. 6, although the operating principles are essentially the same as in the preceding embodiments of FIGS. 4 and 5. In this example, three-phase alternating current is used for power and the air circulation function is performed by three sets of fans, of which fans 27 operate constantly, fans 40 are subtracted during the storage phase of operation to reduce humidity as required by causing moisture to drop out of the circulated air, and fans 41 are added during the chill phase to supply additional air circulation capacity.

The control system of FIG. 6 includes a clock-controlled function selector means 43 which can be a manually controlled or clock-controlled switch. It serves to switch the function of the system over from chill to storage and back again, depending on the type of load then being handled. A similar clock-controlled means 44 provides for a defrosting cycle, if desired. Each of the fans 27, 40, 41 is operated from the three-phase power supply by means of a motorized automatic switch 45 powered by a step-down transformer 46. Temperature control for storage is achieved with a thermostat 47, preferably of the high-sensitivity type which will make or break upon sensing a temperature rise or fall on the order of 0.1° F. from about 36° F. The thermostat 47 controls a solenoid liquid refrigerant valve (as well as any suction control valve) admitting refrigerant to the evaporator with which the control system is associated. In the chill phase of operation, the function selector means 43 causes a chill humidistat 48 to energize the added fans 40, 41 by means of a relay 49 upon sensing a rise in relative humidity above a predetermined level, preferably 75%.

For storage operation, the clock-controlled function selector 43 shifts to its alternate position whereby a storage humidistat 50 controls the added fans 40 by de-energizing them upon sensing an excessively high relative humidity for storage, such as 96%. The selector 43 may also actuate the refrigerant control valves (such as valve 26 and any suction control valve) to reduce the cooling capacity of the evaporator to meet storage conditions. When the storage humidistat 50 indicates an excessively high relative humidity during the storage phase of operation, adding and removing the air circulation capacity of the added fans 40 allows the air circulated over the evaporator of the particular unit 13 controlled to be alternately chilled to above or below its dew point, thereby selectively depositing moisture on the evaporator coils in the form of condensation or frost. If desired, a defrosting system can be added to the control system of FIG. 6 by the addition of a further function selector switch and other necessary equipment for hot gas or electrical defrosting (not shown). The various fans, valves and defrosting means are controlled by a defrost relay 51, a chill fan relay 52, a storage fan relay 53, and a storage temperature control relay 54.

The storage thermostat 46 is preferably set to maintain air temperature at about 30° F., as the preferable storage condition for storing beef carcasses is a range of about 29–31° F. The preferable relative humidity condition for meat storage is about 96%, and for this reason the storage humidistat 50 should be adjusted de-energize the added fans 40 when humidity exceeds this range.

Although a time clock can be used to shift between the chill and storage phases of system operation if a regular work shift is expected, shifting can also be done manually or automatically according to temperature within the compartments. The introduction of warm, moist product from the killing floor will generally cause a rise in temperature above the preferred storage conditions which is of longer duration than the transient rises experienced due to opening doors, and the like. Therefore, a chill phase crossover temperature condition can be established and a thermostat means 55 is used to control the shift in system operation from chill conditions to storage conditions. This crossover temperature condition is preferably between 20° F. and 35° F., with a time delay means being provided so that the system is not responsive to transient conditions of rising temperature. Another thermostat may be used to shift from storage conditions to chill conditions at a higher temperature. The first such thermostat preferably operates with a range of 20°–35° F., while the second operates withni a range of 40°–45° F. (the latter range being above the desired storage conditions).

If desired, a method can be followed whereby additional fans and humidistats can be added to progressively bring additional air circulation capacity into operation in stepwise fashion at progressively higher predetermined relative humidity levels, starting at an even lower initial humidity level, or the entire increase can be accomplished in one stage.

In operating the system with a stepwise method of control it is possible to start at an initially lower air circulation rate of, for example, 1,500 c.f.m. per ton With initial conditions less than 75% relative humidity, no moisture condensation will result as long as the 75% relative humidity condition is not exceeded. As warm, moist product is brought into the chill area the point of system operation will rise along the 1,500 c.f.m. per ton line in the chart of FIG. 7, reaching equilibrium where the rate of moisture removal by condensation is equal to the rate of moisture lost by the product. If the relative humidity in the room rises to 80%, it can be seen from the chart of FIG. 7 that the rate of moisture removal will be about one pound of moisture per hour per ton of refrigeration, which is an unacceptably high rate when compared with the much lower rates achievable by the practice of the present invention. But by increasing the rate of air circulation to a higher rate of about 2,000 c.f.m. per ton upon sensing the 75% relative humidity, the rate of moisture removal can be again reduced to zero until the humidity reaches 80%. At this point the air circulation rate is further increased to about 4,000 c.f.m. per ton, resulting in no moisture removal until the 90% relative humidity condition is reached. Upon sensing 90%, as much as 8,000 c.f.m. per ton may be used, until the cost of additional air circulation equipment exceeds the savings available in reduced shrink. It will be appreciated that the number of incremental steps may be varied to suit each individual application.

The following is claimed as invention:

1. A refrigerating system for chill compartments in which an initially warm, moist product is chilled prior to being thereafter maintained at given temperature and relative humidity storage conditions comprising, in combination, a source of liquid refrigerant, an evaporator connected to the source, and valve means for selectively admitting liquid refrigerant from the source to the evaporator;

thermostat means responsive to variations in compartment temperature from said given temperature conditions for cintrolling said valve means;

air-circulating means for circulating air between the compartment and the evaporator at a first rate of at least 3,000 c.f.m. per ton of maximum evaporator refrigerating effect, and at a lower second rate; and humidistat means responsive to an increase in compartment relative humidity above a predetermined chill-phase relative humidity chill condition for operating the air-circulating means at its first rate, whereby the moisture removed from the product is minimized during chill; and override means responsive to a decrease in compartment temperature to a value corresponding with said given product storage temperature condition for operating the air-circulating means at said lower rate.

2. Apparatus as defined in claim 1 for chilling fresh meat carcasses in which the given storage temperature condition is a range of about 29–31° F. and the predetermined relative humidity chill condition is about 75%.

3. Apparatus as defined in claim 1 in which said thermostat, humidistat and override means are positioned to sense compartment conditions in air flowing from the compartment to the evaporator.

4. Apparatus as defined in claim 1 in which the rate of air circulation is about 5,000 c.f.m. per ton of maximum evaporator refrigerating effect.

5. A refrigerating system for a combination chill and storage compartment in which an initially warm, moist product is chilled and thereafter maintained at given temperature and relative humidity storage conditions, comprising in combination a source of liquid refrigerant, an evaporator connected to the source, and valve means for selectively admitting liquid refrigerant from the source to the evaporator;

thermostat means responsive to variations in compartment temperature from said given temperature conditions for controlling said valve means;

air-circulating means for circulating air between the compartment and the evaporator at a first rate of at least 3,000 c.f.m. per ton of maximum evaporator refrigerating effect, and at lower rates at which, for air at said given storage temperature condition, the circulated air is alternatively cooled above and below its dew point in the evaporator;

first humidistat means responsive to an increase in compartment relative humidity above a predetermined chill-phase relative humidity condition for operating the air-circulating means at its maximum rate, whereby the moisture removed from the product is minimized during chill;

second humidistat means responsive to an increase in compartment relative humidity above said relatively humidity storage condition for operating the air-circulating means at said lower rates at which air at said storage temperature condition is alternately cooled above and below its dew point thereby to selectively deposit moisture in the evaporator by condensation; and phase selection means for engaging said first humidistat means during the chill phase for chilling of a warm product down to storage temperature conditions, and thereafter disengaging the first humidistat means and engaging said second humidistat means during storage.

6. Apparatus as defined in claim 5 in which said phase selection means includes a clock.

7. Apparatus as defined in claim 5 in which said phase selection means includes a temperature-responsive switch means responsive to a decrease in compartment temperature to a value corresponding with said given product storage temperature condition.

8. Apparatus as defined in claim 5 in which said phase selection means includes a temperature-responsive switch means responsive to a decrease in compartment temperature below a predetermined chill-phase crossover temperature.

9. Apparatus as defined in claim 5 in which the rate of air circulation is about 5,000 c.f.m per ton of maximum evaporator refrigerating effect.

10. Apparatus as defined in claim 8 for chilling and storing meat carcasses in which the given storage temperature condition is a range of about 29–31° F., the given relative humidity storage condition is a range of about 92–96%, and said predetermined chill-phase crossover temperature is between 20° F. and 35° F.

11. A method of operating a refrigerating system for chilling compartments in which an initially warm, moist product is chilled to given temperature and relative humidity conditions prior to storage, comprising the steps of:
circulating air at an initial rate between air-cooling means and the compartment sensing the temperature of air flowing from the compartment to the air-cooling means, and thermostatically adjusting the cooling effect of the air-cooling means to maintain compartment air temperature within said conditions;
sensing the relative humidity of air flowing from the compartment to the air-cooling means, and in response to sensing relative humidity above said predetermined humidity condition;
increasing the rate of air circulation from said initial rate to a higher rate of at least 3,000 c.f.m. per ton of maximum cooling refrigerating effect while said sensed humidity condition persists, whereby the moisture removed from the product is minimized during chill;
sensing the temperature of air flowing from the compartment to the air-cooling means, and in response to sensing air temperature below a predetermined crossover temperature;
thereafter in response to sensing relative humidity above said predetermined humidity condition, selectively reducing the air circulation rate whereby the circulated air is alternately cooled above and below its dew point in the air-cooling means, thereby to selectively deposit moisture by condensation.

12. The method defined in claim 11 in which the given temperature condition is a range of about 29–31° F., the given relative humidity condition is a range of about 92–96%, and the crossover temperature is between 20° F. and 35° F.

13. A method of operating a refrigerating system for chilling compartments in which an initially warm, moist product is chilled to given temperature and relative humidity conditions prior to storage, comprising the steps of:
circulating air at an initial rate of about 1,500 c.f.m. per ton of refrigeration effect between air-cooling means and the compartment, sensing temperature of air flowing from the compartment to the air-cooling means, and thermostatically adjusting the cooling effect of the air-cooling means to maintain compartment air temperature within a predetermined range,
sensing the relative humidity of air flowing from the compartment to the air-cooling means, and in response to sensing relative humidity greater than 75%, increasing the rate of air circulation to about 2,000 c.f.m. per ton,
further sensing the relative humidity of air flowing from the compartment to the air-cooling means, and in response to sensing relative humidity above 80%, further increasing the rate of air circulation to about 4,000 c.f.m. per ton,
further sensing the relative humidity of air flowing from the compartment to the air-cooling means, and in response to sensing relative humidity above 90%, further increasing the rate of air circulation to about 8,000 c.f.m. per ton, whereby the moisture removed from the product is minimized during chill.

14. A refrigerated storage compartment for the chilling of initially warm, moist product and for the storage of said product thereafter at given temperature and relative humidity conditions, comprising in combination:
an enclosed storage area divided into a plurality of cooling zones;
an individual unit zone refrigerating system as defined in claim 5 located in each of the cooling zones.

15. Apparatus as defined in claim 14 in which each unit zone refrigerating system includes a vertically oriented air conduit structure open at top and bottom, said conduit having means at its bottom for directing a downward flow of air into the lower portion of the storage compartment zone, and in which said air-circulating means comprises a downwardly directed variable discharge fan means mounted within said conduit.

16. Apparatus as defined in claim 15 including
a common supply line comprising the source of liquid refrigerant for each of said systems;
a common return line receiving vaporized refrigerant from each of said zone refrigerating systems; and
motor-driven compressor means for compressing liquid refrigerant received from the common return line, condenser means for condensing the discharge from the compressor means, and receiver means for receiving condensed refrigerant from the condenser means and supplying said common supply line.

References Cited
UNITED STATES PATENTS

| | | | |
|---|---|---|---|
| 2,528,720 | 11/1950 | Binder | 62—176 |
| 2,661,603 | 12/1953 | Trask | 62—176 |
| 3,152,455 | 10/1964 | Ware | 62—180 |

WILLIAM J. WYE, Primary Examiner

U.S. Cl. X.R.

62—176, 180, 158, 419, 223